United States Patent [19]

Schumm, Jr.

[11] Patent Number: 4,469,764

[45] Date of Patent: Sep. 4, 1984

[54] SEAL CLOSURE FOR A GALVANIC DRY CELL

[75] Inventor: Brooke Schumm, Jr., Bay Village, Ohio

[73] Assignee: Union Carbide Corporation, Danbury, Conn.

[21] Appl. No.: 449,574

[22] Filed: Dec. 14, 1982

[51] Int. Cl.³ .............................................. H01M 2/00
[52] U.S. Cl. ...................................... 429/86; 429/167; 429/173; 429/174; 429/185
[58] Field of Search ............... 429/166, 167, 171, 173, 429/174, 177, 185, 82, 163, 86

[56] References Cited

U.S. PATENT DOCUMENTS

| | | | |
|---|---|---|---|
| 2,850,558 | 9/1955 | Urry | 429/86 |
| 3,506,495 | 4/1970 | Reilly et al. | 429/86 |
| 3,802,923 | 4/1974 | Spanur | 429/54 |
| 3,967,977 | 7/1976 | Affeldt | 429/82 |

Primary Examiner—Anthony Skapars
Attorney, Agent, or Firm—Cornelius F. O'Brien

[57] ABSTRACT

A galvanic dry cell includes a cylindrical container having an open end provided with a closure having a centrally disposed aperture adapted to be slid over and secured to the carbon rod of the cell and a peripherally disposed depending flange having an undercoating of a soft sealant into which the upper rim of the container is embedded, thereby providing a seal closure for the container.

8 Claims, 5 Drawing Figures

SEAL CLOSURE FOR A GALVANIC DRY CELL

TECHNICAL FIELD

This invention relates to sealed galvanic dry cells and a method of assembling them. More particularly the invention relates to a seal closure for the open end of a cylindrical container in which the closure defines a centrally disposed opening through which the upper portion of the current collector (typically a carbon rod) of the cell is snugly slid through and secured thereat, and wherein said closure has a peripherally disposed depending flange and a sealant, such as asphalt, disposed on its undersurface adjacent said flange into which the upper rim of the container is embedded thereby providing a seal for the container.

BACKGROUND ART

Conventional galvanic dry cells for use in flashlights, toys or other sundry devices generally comprise a cylindrical container, such as a zinc anode can, with a depolarizer mix filling most of the container and having a carbon rod in the center which functions as the current collector for the depolarizer mix. The cells are generally sealed by inserting a support washer over the cathode depolarizer mix and then dispensing molten asphalt onto the washer thereby providing an asphalt seal for the cells while also providing an airspace above the depolarizer mix and below the asphalt seal to accommodate the discharge gases and exudate of the cells.

Although asphalt seals have been employed with some success in sealing galvanic dry cells, they do have a number of drawbacks or disadvantages. For example, several assembly procedures are required such as placing a support washer down into the cell, pouring an asphaltic pitch onto the support washer, placing a vent washer on top of the asphaltic pitch and then finally placing a terminal cap on top of the cell and locking it in place. The vent washer can be used to prevent the terminal cap from becoming embedded in the pitch which could possibly result in forming a gastight seal which could prevent venting. In addition, it is possible that the inside surface of the container could become dirty due to mercury contamination prior to dispensing the asphaltic pitch. This could result in a pseudo-seal which, over a period of time, could eventually lead to moisture loss from the cell and/or oxygen ingress to the cell because of insufficient adhesion of the pitch to the can or container. It is also possible that during the heating of the asphalt pitch to cause a meniscus to form at the can-asphalt interface, pin holes may form in the pitch as a result of expansion of the air in the void volume below the support washer which would allow moisture loss and/or oxygen ingress to the cell. Another disadvantage in the use of conventional asphalt seals is that they physically take up a relatively large space in the cell thereby limiting the size of the airspace into which the reaction products of the cells can discharge.

In the above-described cells, the venting of the gases from within the cell can take place through a porous current collector such as a carbon rod or the like. Although a properly prepared asphalt seal will effectively minimize electrolyte or moisture loss through evaporation and minimize air or oxygen ingress to the cells, the assembly and quality control techniques required to insure good seals are rather expensive and time consuming.

Finished cells that do not meet the minimum quality standards for one reason or another are usually disassembled or detubed so that the raw cell components can be reused. However, in conventional constructions where the container is adhered to a jacket, recovery of the raw cell components is messy and expensive. Furthermore, when a top centering seal washer is employed as part of the finished cell, the detubing operation (removal of the outer jacket) may disturb this centering washer which in turn may cause the depolarizer mix contact to be somewhat loosened which could result in loss of amperage.

U.S. Pat. No. 3,967,977 discloses a closure for galvanic cells having a centrally disposed tubular neck adapted to be snugly slid over and adhesively secured to the current collector of the cell and having a peripherally disposed tubular skirt adapted to be snugly slid on and adhesively secured to the upper rim of the cell's container thereby providing a seal for the cell. The only venting in this type of cell construction is through the wall of the carbon electrode. In some cell systems that develop a relatively high amount of spew and/or gas, this cell construction may be inadequate.

An object of the present invention is to provide a one piece closure for a dry cell which provides maximum airspace above the depolarizer mix of the cell and below the closure.

Another object of the present invention is to provide a thin molded plastic cover in conjunction with an undercoating of a soft sealant, such as asphalt, as a closure for a galvanic cell which produces a good seal and venting means while avoiding cell heating resulting from in situ asphalt pouring that is generally necessary when using conventional asphalt sub seal techniques.

Another object of the present invention is to provide a thin closure for a galvanic dry cell having a top surface contour fabricated to substantially conform to the bottom surface contour of a metal terminal cap of the cell so as to provide a maximum airspace above the depolarizer mix of the cell and below the closure.

Another object of the present invention is to provide an easy and inexpensive method for assembling a closure onto the container of a cell so as to seal the container.

The foregoing and additional objects of this invention will become more fully apparent from the following description and accompanying drawings.

DISCLOSURE OF THE INVENTION

The invention relates to a galvanic cell comprising in combination a cylindrical container having an open end, an electrode comprising a depolarizer mix disposed within said container and separated therefrom by a separator, a current collector centrally embedded in and extending above said depolarizer mix, and a closure covering the open end of said container, said closure comprising a cover having an aperture defined at its center, a downwardly disposed depending flange at its periphery and a sealant disposed on its undersurface adjacent the flange and extending at least partially radially inwardly such that the upper rim of the container is embedded into said sealant and wherein the upper portion of the current collector passes through and is secured within the aperture defined in said closure, thereby providing a closure vent seal for said cell. The outer depending flange helps to stiffen the closure, but its main function is to serve as a retainer wall for the sealant. The depth of the flange need be no greater than that required to retain the sealant, and this depth may be about 0.05 inch or greater and preferably about 0.125 inch. The flange may be entirely curved as viewed in section, but it may also have a tubular portion. Preferably, the outer diameter of the flange should be no greater than the outer diameter of the container.

Using this type of closure means, gas buildup within the cell could vent through the porous current collector rod and/or through or by the sealant, if employed, at the interface of the closure and the collector rod and through or by the sealant at the interface of the closure and upper rim of the container.

The invention also relates to a method for assembling a galvanic cell comprising the steps:

(a) assembling into a cylindrical container having a closed end and an open end, an electrode comprising a depolarizer mix which is electronically insulated from the container by a separator, and a current collector embedded in said depolarizer mix and extending above said depolarizer mix;

(b) preparing a closure for the container having an aperture defined at its center and a flange depending from its periphery;

(c) placing a sealant at the undersurface of the cover adjacent the depending flange and extending at least partially inwardly, and preferably placing a sealant around the upper portion of the current collector or on the undersurface of the closure adjacent the aperture at the center; and (d) placing said closure on top of the container such that the upper rim of the container is embedded in the sealant adjacent the depending flange and the upper portion of the current collector passes through the aperture at the center of the closure and is secured therein thus providing a closure vent seal for the cell.

Another embodiment of this invention for use with a galvanic dry cell employing a two-piece metal terminal closure comprises a cover having a peripheral depending flange with at least an annular pocket of soft sealant on its undersurface so that the upper portion of the container can be embedded into the sealant and said cover further having a centrally disposed opening adapted to slide over the center metal terminal cap of the two-piece terminal closure such that a portion of the inner bottom surface of the cover will rest upon and be adhesively secured to the top surface of an outward flange depending from the bottom of the center terminal cap. A conventional annular terminal plate could then be placed on top of the closure whereupon the peripheral edge of the annular plate could be locked in engagement with the external tubular jacket of the cell in a conventional manner as basically shown in U.S. Pat. No. 3,967,977.

The soft sealant for use on the undersurface of the closure adjacent the depending flange could be selected from the group consisting of asphalt, modified asphalt, wax, grease or the like. Modified asphalt is preferred because of its chemical and physical stability, softness, surface tack and low cost.

The same type of sealant could be used at the undersurface of the closure adjacent the centrally disposed aperture for sealing the current collector within said aperture if such a sealant is required. Alternatively, materials suitable for use in adhesively securing the closure to the current collector or the metal terminal cap can be any adhesive that will not adversely react with either the closure material or the cell components. Suitable adhesives are disclosed in the textbook titled "Handbook of Adhesives" edited by Irving Skeist-Reinhold Publishing Corp. N.Y. (1962). Another class of suitable adhesives is the fatty polyamides which are produced from dibasic fatty acids. As defined in the "Encyclopedia of Polymer Science and Technology" Vol. 10, Interscience Publishers, a division of John Wiley & Sons, Inc., fatty polyamides are condensation products of di-and polyfunctional amines and di-and polybasic acids obtained by the polymerization of unsaturated vegetable oil acids or their esters.

The closure of this invention can be made of an insulating material such as plastic, e.g., polyethylene, polypropylene, rigid vinyl, polycarbonate, high impact polystyrene, copolymers made from acrylonitrile, butadiene and styrene (ABS) and nylon. Of the above, polypropylene would be the preferred material. The material thickness of the closure can vary although a thickness between about 0.010 inch and about 0.06 inch has been found acceptable with a thickness about 0.02 inch being preferable. Closure material thickness less than about 0.010 inch would be insufficient to provide a good seal.

BRIEF DESCRIPTION OF DRAWINGS

The present invention will become apparent from the following description thereof when considered together with the accompanying drawings which are set forth as being exemplary of embodiments of the present invention and are not intended, in any way, to be limitative thereof and wherein.

Figure 1:
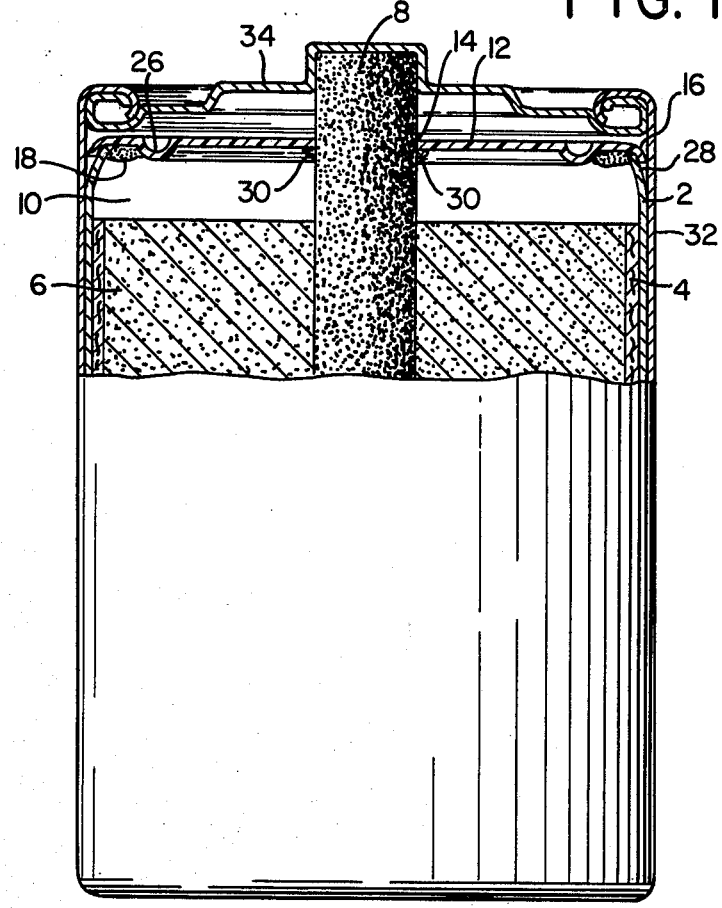
FIG. 1 is an elevational view, partly in cross-section, of a primary galvanic dry cell incorporating an embodiment of the seal closure of this invention.
Figure 2:
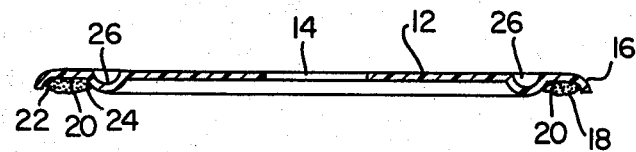
FIG. 2 is a vertical view, in cross-section, of the seal closure used in the dry cell shown in FIG. 1 prior to cell assembly.

Referring to the drawing and particularly to FIGS. 1 and 2 there is shown a galvanic dry cell embodying the invention. The dry cell includes a cylindrical container 2 which is made of an electrochemically consumable metal, such as zinc, which serves as the anode of the cell. Included in container 2 are an insulator disc (not shown) disposed at the bottom of the container 2, a separator 4 lining the vertical wall of the container, a cathode electrode comprising a depolarizer mix 6, said mix being disposed within but separated from said container by the insulator disc and the separator 4, and a current collector 8 centrally embedded in the depolarizer mix 6. The insulator disc could be made of plastic or any other suitable insulating material. The separator 4 may comprise an electrolyte paste layer or may be a thin film separator containing electrolyte, e.g., a thin bibulous paper coated with an electrolyte gel paste. The cathode depolarizer mix 6 is an electrochemically active cell component and may contain, for example, manganese dioxide, a conductive material such as carbon black or graphite and an electrolyte. The depolarizer mix 6 is usually molded around a central carbon cathode collector rod 8 before being inserted into the cell container, or the depolarizer mix 6 could be first inserted into the container 2 whereupon the current collector 8 could then be forced into the mix. A conventional centering washer (not shown) could be employed to maintain the current collector 8 in an upright axial position.

The top of the cathode depolarizer mix 6 is disposed a fixed distance below the open end of the cell container 2 to provide the usual airspace 10 to accommodate any liquid spew that may be formed during cell storage and/or cell discharge.

An electrically insulating closure 12 is provided for sealing the open end of the cell container 2. As best shown in FIG. 2, closure 12 is formed as a disc-like member having a centrally defined aperture 14. At the periphery of the closure 12 is a downwardly depending flange 16. As shown in FIGS. 1 and 2 a soft sealant 18, such as asphalt, is positioned in the annular groove 20 defined by the inner wall 22 of flange 16 and the lower outer surface 24 of annular ridge 26. Preferably the rim portion 28 of container 2 should be crimped or necked in to allow for the flange so as to provide an overall uniform raw cell diameter as shown in FIG. 1. When assembling the closure 12 onto container 2, the rim 28 is embedded into the soft sealant 18 thereby effectively sealing the flange 16 of closure 12 to container 2. A similar sealant 30 could be either placed on the undersurface of closure 12 adjacent aperture 14 or applied to the upper portion of the wall of current collector 8. The diameter of aperture 14 is made such as to provide a snug sliding fit over current collector 8 so that in conjunction with sealant 30, collector 8 will be sealed to closure 12. If desired, an adhesive of the type mentioned above could be used instead of the sealant on current collector 8. If also desired, the aperture 14 could be formed from a tubular neck as described in U.S. Pat. No. 3,967,977.

As shown in FIG. 1, with the closure 12 in place an effective fluid-tight seal around the open end of the cell container 2 is formed which effectively seals the raw cell against the escape of electrolyte and/or moisture by evaporation and seals it against the ingress of air and oxygen from the atmosphere. As stated above, the sealed raw cell could vent through the porous current collector such as a carbon rod and through or by the sealant.

The cell proper (i.e. raw cell) with the closure 12 locked in place at the open end of the cell container 2 is finished by encasing it within an outer cell assembly including an outer tubular non-corrodible jacket 32 suitably made of a fibrous material such as kraft paper. The upper end of the tubular jacket 32 extends beyond the closure 12 and is locked in engagement with the outer peripheral edge of a one piece metallic top cover plate 34 in a conventional manner.

The outer cell assembly includes means for venting any gas released from inside the cell container 2 to the outer atmosphere. Such means may be provided, for example, by making the locked engagement between the top cover plate 34 and the jacket 32 permeable to gas.

Figure 3:
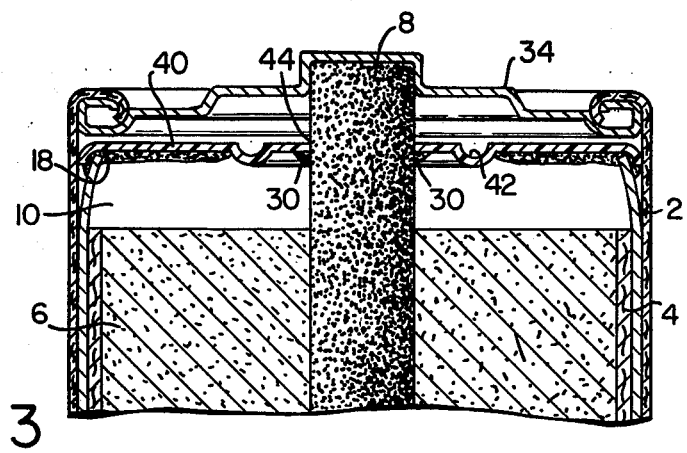
FIG. 3 is an elevational cross-sectional view of the top portion of a dry cell illustrating another embodiment of the invention.

FIG. 3 shows another embodiment of the invention having some similar components as the cell shown in FIG. 1 which are identified with the same numerical designations. The distinction in FIG. 3 is in the use of a closure 40 having a different contour. Specifically, annular ridge 42 is disposed closer to the centrally located aperture 44 than is annular ridge 26 of closure 12 of FIG. 2. A benefit of this type of closure is that the engagement of closure 12 with current collector 8 is enhanced by a spring-like action attributed to the particular location of ridge 42.

Figure 4:
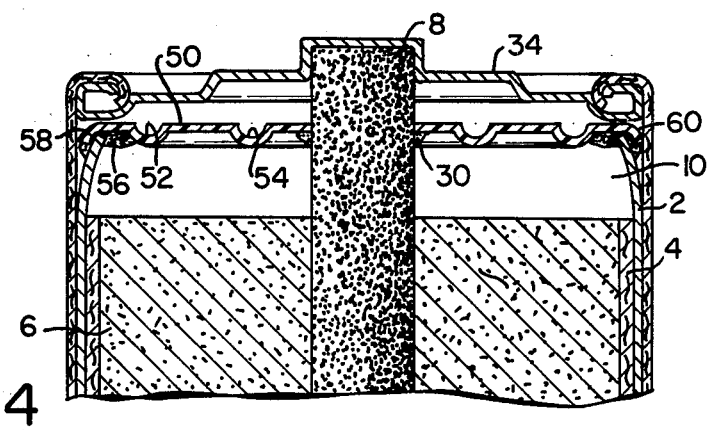
FIG. 4 is an elevational cross-sectional view of the top portion of a dry cell illustrating another embodiment of the invention.

FIG. 4 shows another embodiment of the invention having some similar components as the cell shown in FIG. 1 which are identified with the same numerical designations. The distinction in FIG. 4 is in the use of a closure 50 having a different contour. Specifically, closure 50 has two annular ridges 52 and 54. Annular ridge 52 defines an annular groove 56 formed with the inner wall 58 of flange 60 on the undersurface of closure 50. This groove 56 has the benefit in that the sealant location is more precisely defined and easily filled. In a like manner, annular ridge 54 has the same benefit as annular ridge 42 of FIG. 3.

Figure 5:
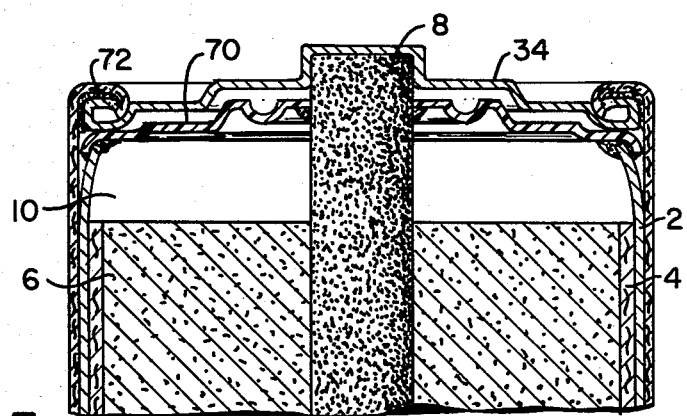
FIG. 5 is an elevational cross-sectional view of the top portion of a dry cell illustrating another embodiment of the invention.

FIG. 5 shows another embodiment of the invention having some similar components as the cell shown in FIG. 1 which are identified with the same numerical designations. The distinction in FIG. 5 is in the use of a closure 70 having a different contour. Specifically, the configuration of closure 70 is similar in contour to that of metallic cap cover plate 34 so as to provide a maximum airspace 10 between depolarizer mix 6 and closure 70.

It is also within the scope of this invention to employ a wax fillet at the top curl where the edge of the terminal plate and top of the jacket are spun as shown in FIG. 5 and designated as 72.

Thus the invention provides a vent closure seal for the open end of a cylindrical container used in sealed galvanic dry cells which requires a minimum number of parts and which is, therefore, relatively inexpensive to manufacture. The closure vent seal can be easily and accurately assembled during manufacture of the dry cells and gives highly reliable and reproducible results in containing and venting gases and confining cell exudate during cell storage and discharge.

The closure of this invention offers a number of advantages such as:

1. The raw cell may be aged independent of the jacket;
2. The closure will limit moisture loss from and oxygen ingress to the cell;
3. The sealant provides an area contact rather than a line contact, thus an increased leakage resistance path;
4. The closure allows appearance rejects to be reclaimed without disturbing the raw cell assembly;
5. The closure may be thin to provide minimum material cost and can be pressure-vacuum formed at high production rates;
6. Hot sealant is applied directly to the closure thus avoiding the need for heating the cell which is normally required with the use of conventional asphalt type seals; and
7. The closure can provide an increase in void volume of the raw cell for spew containment or an increase in mix height and service capacity compared to a conventional asphalt sealed cell.

EXAMPLE 1

A plurality of D size raw cells were constructed substantially as shown in FIGS. 1 and 2. Specifically, the cells were fabricated using a zinc can, a kraft paper bottom insulator disposed in the bottom of the can, a paste separator lining the vertical wall of the zinc can, a positive electrode of depolarizer mix composed of manganese dioxide, carbon black and Leclanche electrolyte disposed in and separated from the zinc can by the bottom separator and the vertical separator, and a porous carbon rod centrally embedded in the depolarizer mix. A polypropylene closure as shown in FIG. 2 having a sealant on its undersurface adjacent the flange was placed over the open end of each zinc can and, using a soft sealant, the carbon rod was secured to the opening in the closure. The rim of the container was embedded into the asphalt or wax as shown in FIG. 1. The asphalt used was a modified asphalt obtained from Witco Chemical Co. under the tradename Battery Sealer 760H. The raw cells were then assembled in a Mylar-lined jacket with a waxed bottom curl. The cells were discharged under various conditions and the data obtained are shown in the Tables.

In Test 1, each of a plurality of cells was discharged across a 2.25 ohm load continuously until a 0.65 cut-off voltage level was reached. The cells were then stored on a shelf at room temperature (20° C.). The percentage of cells found with external electrolyte leakage as a function of months in storage was calculated and is shown in Table 1.

In Test 2, each of a plurality of cells was discharged across an 8 ohm load until a 0.75 cut-off voltage level was reached. The cells were then stored on a shelf at room temperature (20° C.). The percentage of cells found with external electrolyte leakage as a function of months in storage was calculated and is shown in Table II.

In Test 3, each of a plurality of cells was discharged across a 25 ohm load until a 0.75 cut-off voltage level was reached. The cells were then stored on a shelf at room temperature (20° C.). The percentage of cells found with external electrolyte leakage as a function of months in storage was calculated and is shown in Table III.

In Test 4, each of a plurality of cells was discharged across a 2.25 ohm load for four minutes an hour for eight hours a day until a 0.65 voltage level was reached. The cells were then stored on a shelf at room temperature (20° C.). The percentage of cells found with external electrolyte leakage as a function of months in storage was calculated and is shown in Table IV.

TABLE I

| Flange/Rim Seal | Aperture/ Electrode Seal | No. of Cells | TIME (Months) | | | | | |
|---|---|---|---|---|---|---|---|---|
| | | | 1 | 2 | 3 | 4 | 5 | 6 |
| | | | Percent of cells observed with outside leakage | | | | | |
| ASPHALT | ASPHALT | 1 | 0 | 0 | 0 | 0 | 0 | 0 |
| ASPHALT | ASPHALT | 5 | 60 | 60 | 80 | 100 | 100 | 100 |
| ASPHALT | SILICONE | 5 | 0 | 0 | 20 | 20 | 20 | 20 |
| WAX | ASPHALT | 6 | 0 | 33 | 33 | 33 | 50 | 50 |
| WAX | ASPHALT | 5 | 80 | 80 | 80 | 80 | 100 | 100 |
| WAX | SILICONE | 6 | 0 | 33 | 33 | 50 | 66 | 66 |

TABLE II

| Flange/Rim Seal | Aperture/ Electrode Seal | No. of Cells | TIME (Months) | | | | | |
|---|---|---|---|---|---|---|---|---|
| | | | 1 | 2 | 3 | 4 | 5 | 6 |
| | | | Percent of cells observed with outside leakage | | | | | |
| ASPHALT | ASPHALT | 5 | 20 | 20 | 40 | 40 | 40 | 40 |
| ASPHALT | SILICONE | 5 | 40 | 60 | 80 | 80 | 80 | 100 |
| WAX | ASPHALT | 6 | 0 | 0 | 0 | 16 | 16 | 33 |
| WAX | SILICONE | 6 | 0 | 16 | 33 | 66 | 66 | 66 |

TABLE III

| Flange/Rim Seal | Aperture/ Electrode Seal | No. of Cells | TIME (Months) | | | | | |
|---|---|---|---|---|---|---|---|---|
| | | | 1 | 2 | 3 | 4 | 5 | 6 |
| | | | Percent of cells observed with outside leakage | | | | | |
| ASPHALT | ASPHALT | 2 | 0 | 0 | 0 | 0 | 0 | 0 |
| ASPHALT | ASPHALT | 5 | 0 | 0 | 0 | 0 | 0 | 0 |
| ASPHALT | SILICONE | 5 | 20 | 20 | 20 | 20 | 20 | 20 |
| WAX | ASPHALT | 6 | 0 | 0 | 0 | 0 | 0 | 0 |
| WAX | ASPHALT | 5 | 0 | 0 | 0 | 0 | 20 | 20 |
| WAX | SILICONE | 6 | 0 | 0 | 0 | 0 | 0 | 0 |

TABLE IV

| Flange/Rim Seal | Aperture/ Electrode Seal | No. of Cells | TIME (Months) | | | | | |
|---|---|---|---|---|---|---|---|---|
| | | | 1 | 2 | 3 | 4 | 5 | 6 |
| | | | Percent of cells observed with outsideleakage | | | | | |
| ASPHALT | ASPHALT | 2 | 0 | 0 | 0 | 0 | 0 | 0 |
| ASPHALT | ASPHALT | 5 | 0 | 0 | 0 | 0 | 0 | 0 |
| ASPHALT | SILICONE | 5 | 0 | 0 | 0 | 0 | 0 | 0 |
| WAX | ASPHALT | 6 | 0 | 0 | 0 | 0 | 0 | 0 |
| WAX | ASPHALT | 5 | 20 | 20 | 20 | 20 | 20 | 20 |
| WAX | SILICONE | 6 | 0 | 0 | 0 | 0 | 0 | 0 |

I claim:

1. A galvanic cell comprising in combination a container having an open end, a closed end and an upstanding wall terminating with an upper rim which defines the open end; an electrode comprising a depolarizer mix disposed within said container and separated from the upstanding wall by a separator; a current collector centrally embedded in said depolarizer mix and extending above the upper rim of said container; a closure covering the open end of said container, said closure comprising a cover having a top surface, a bottom surface, a downwardly depending peripheral flange and an aperture defined at its center through which the upper portion of the current collector passes and is secured within said aperture; a sealant disposed on the bottom surface of said cover adjacent to and retained by said depending peripheral flange and wherein the upper rim of the container is embedded into the sealant thereby providing a sealed cell.

2. The galvanic cell of claim 1 wherein an annular ridge is disposed in the top surface of the cover surrounding the aperture defined at the center of the cover.

3. The galvanic cell of claim 1 wherein the sealant is selected from the group consisting of asphalt, modified asphalt, wax, and grease.

4. The galvanic cell of claim 3 wherein a sealant is also disposed on the bottom surface of the cover adjacent the aperture.

5. The galvanic cell of claim 3 wherein an adhesive is disposed at the interface of the aperture in the cover and the current collector thereby forming an adhesive seal therebetween.

6. The galvanic cell of claim 1 wherein said upper rim of the container is inwardly crimped an amount to accommodate the thickness of the flange so as to provide an overall uniform diameter for the container and cover assembly.

7. The galvanic cell of claim 1 wherein the cover is made of a material selected from the group consisting of polyethylene, polypropylene, rigid vinyl, polycarbonate, high impact polystyrene, copolymers made from acrylonitrile, butadiene and styrene, and nylon.

8. The galvanic cell of claim 1 wherein the container is encased in an outer cell finish assembly including an outer tubular jacket the upper end of which extends beyond the cover and is locked in engagement with the outer peripheral edge of a metallic top terminal cover plate and wherein a portion of the upper surface of the cover is shaped to contour fit with a portion of the internal surface of the metallic top terminal cover plate so as to provide an effectively larger airspace above the depolarizer mix and below the cover.

* * * * *